United States Patent [19]
Umezawa et al.

[11] Patent Number: 5,381,328
[45] Date of Patent: Jan. 10, 1995

[54] PWM INVERTER CONTROL SYSTEM AND METHOD

[75] Inventors: Kazuyoshi Umezawa; Osamu Sato, both of Kawasaki, Japan

[73] Assignee: Fuji Electric Co., Ltd., Kawasaki, Japan

[21] Appl. No.: 142,994

[22] Filed: Oct. 29, 1993

[30] Foreign Application Priority Data

| Oct. 30, 1992 | [JP] | Japan | 4-291845 |
| Feb. 2, 1993 | [JP] | Japan | 5-015034 |
| Oct. 6, 1993 | [JP] | Japan | 5-249613 |

[51] Int. Cl.$^6$ ............................................. H02M 1/12
[52] U.S. Cl. ............................................. 363/41; 363/95
[58] Field of Search ............... 363/39, 40, 41, 74, 363/78, 95, 97, 131; 323/282, 285, 286

[56] References Cited

U.S. PATENT DOCUMENTS

| 4,792,885 | 12/1988 | Cunman et al. | 363/95 |
| 4,899,269 | 2/1990 | Rouzies | 363/41 |
| 5,001,619 | 3/1991 | Nakajima et al. | 363/41 |
| 5,012,400 | 8/1991 | Yasuda | 363/95 |
| 5,045,989 | 9/1991 | Higaki et al. | 363/41 |
| 5,268,832 | 12/1993 | Kandatsu | 363/95 |

Primary Examiner—Steven L. Stephan
Assistant Examiner—Matthew Nguyen
Attorney, Agent, or Firm—Spencer, Frank & Schneider

[57] ABSTRACT

A PWM inverter system having a sine (low-pass) filter. The sine filter includes a reactor and a capacitor, and is connected to the output of a PWM inverter. The instantaneous current flowing through the capacitor, and the instantaneous output current supplied from the sine filter to a load are detected. An instantaneous voltage command value is corrected on the basis of the detected current values. This makes it possible to limit oscillating waveforms involved in the output voltage of the PWM inverter without using a damping circuit which was connected in parallel with the capacitor in a conventional sine filter. The capacitor of the sine filter may be composed of a plurality of capacitors connected in parallel, and this will serve to further reduce the size of the sine filter. In a parallel operation of a plurality of PWM inverters, a cross current, that is, the difference between an instantaneous output current command value and an instantaneous capacitor current command value is reduced by correcting the instantaneous voltage command value. This makes it possible to share the current assigned to each PWM inverter with high stability.

22 Claims, 7 Drawing Sheets

PWM INVERTER CONTROL SYSTEM AND METHOD

BACKGROUND OF THE INVENTION

1. Field of the Invention

The present invention relates to a PWM inverter control system and method enabling a PWM inverter or PWM inverters connected in parallel to supply stable power.

2. Description of Related Art

Referring to FIGS. 1 and 2, a conventional method for controlling a PWM inverter or PWM inverters will be described.

First, voltage control of a single operation of a PWM inverter 1 will be described. In FIG. 1, a PWM inverter 1 is controlled by a control circuit 33, and the output of the PWM inverter 1 is supplied to a sine filter (LC low-pass filter) 23. The sine filter 23 comprises an LC filter composed of a reactor 25 and a capacitor 26, and a damping circuit 27 which is a serial circuit of a resistor 28 and a capacitor 29. The damping circuit 27 is connected in parallel with the capacitor 26 in order to limit oscillation waveforms accompanying the resonance of the reactor 25 and the capacitor 26. The control circuit 33 comprises a mean value circuit 2, an automatic voltage regulator (AVR) 3, an instantaneous voltage command value generator 7, and a PWM signal generator 9.

The PWM inverter 1, the sine filter 23, and the control circuit 33, together with a rectifier 51 can construct a conventional uninterruptible power supply 50 as shown in FIG. 3.

A method for controlling the PWH inverter is as follows:

First, a voltage detector 12 is connected to the output of the sine filter 23 to detect the instantaneous output voltage V of the sine filter 23. The output voltage V is inputted to the mean value circuit 2. The mean value circuit 2 produces the mean value $V_A$ of the instantaneous output voltage V. The mean value $V_A$ is subtracted from a predetermined voltage reference value $V_A^*$ by a summing point 81, and the difference $\Delta V_A$ is supplied to the automatic voltage regulator 3. The automatic voltage regulator 3 corrects the voltage reference value $V_A^*$ so that the difference $\Delta V_A$ becomes zero, and supplies the resultant corrected voltage reference value $V_A^{}$ to the instantaneous voltage command value generator 7. The instantaneous voltage command value generator 7, receiving the corrected voltage reference value $V_A^{}$ and a predetermined frequency reference value $\omega^*$, generates a sinusoidal instantaneous voltage command value $V^*$ having an amplitude determined by the corrected voltage reference value $V_A^{**}$ and a frequency determined by the frequency reference value $\omega^*$.

Furthermore, the output voltage V is subtracted from the instantaneous voltage command value $V^*$ by a summing point 82, and the difference $\Delta V$ is inputted to a gain adjuster 45. The output of the gain adjuster 45 is added to the voltage command value $V^*$ by a summing point 83. The summing point 83 outputs a corrected voltage command value $V_a^*$, and supplied it to the PWM signal generator 9. The PWM signal generator 9 outputs a pulse signal corresponding to the corrected voltage command value $V_a^*$, and controls the PWM inverter 1 by the pulse signal.

The operation of an inverter control system controlling a plurality of PWM inverters connected in parallel to supply power to a common load will be explained.

FIG. 2 shows this type of control system. In FIG. 2, the output of the inverter 1 is connected to the sine filter 23, and the PWM inverter 1 is controlled by a control circuit 34.

FIG. 4 shows a power supply system including a plurality of uninterruptible power supplies 50. Each uninterruptible power supply 50 is constructed as shown in FIG. 3 using the PWM inverter 1, the sine filter 20, the control circuit 30, and the rectifier 51. The outputs of individual uninterruptible power supplies are connected to a bus board 60, which will be described later, to carry out the parallel operation through the bus board 60, and the output of the bus board 60 is supplied to a load 70. Specifically, the output of each PWM inverter 1 is connected to the bus board 60 through the sine filter 23, and the output of the bus board 60 is connected to the load 70. Here, a method for controlling a single PWM inverter in the plurality of PWM inverters will be explained.

In FIG. 2, a current detector 11 is provided between the sine filter 23 and the bus board 60, and the voltage detector 12 is connected to the output of the sine filter 23. The current detector 11 detects the instantaneous output current $I_L$ flowing out of the sine filter 23, and the voltage detector 12 detects the output voltage V. The other PWM inverters are connected in parallel with the PWM inverter 1 in the bus board 60. The bus board 60 controls distribution of power to a load, and supplies the control circuit 34 of the PWM inverter 1 with an instantaneous output current command value $I_L^*$ which is determined in accordance with the number of PWM inverters operated in parallel. In FIG. 2, reference numerals 42, 43 and 44 designate filters that remove noise contained in a detected value and command values, respectively.

The control circuit 34 includes, in addition to the control circuit 33 shown in FIG. 1, a reactive component synchronous rectifier 5, an active component synchronous rectifier 6, an automatic frequency regulator 4, and summing points 84 and 85. The control circuit 34 controls the PWM inverter 1 in accordance with the output current $I_L$ detected by the current detector 11, the output voltage V detected by the voltage detector 12, and the instantaneous output current command value $I_L^*$ produced from the bus board 60.

More specifically, the control circuit 34 obtains a cross current $I_{ou}$ flowing between the PWM inverter 1 and the other PWM inverters by subtracting the output current $I_L$ from the output current command value $I_L^*$ by the summing point 84. In other words, the cross current $I_{ou}$ is given by the following equation:

$$I_{ou} = I_L^* - I_L \quad (1)$$

The cross current $I_{ou}$ is passed through the filter 44, led to the reactive component synchronous rectifier 5 and the active component synchronous rectifier 6, and is synchronously rectified. The reactive component synchronous rectifier 5 obtains the reactive component $\sin\phi$, whereas the active component synchronous rectifier 6 obtains the active component $\cos\phi$. The active component $\cos\phi$ is supplied to the automatic frequency regulator 4. The automatic frequency regulator 4 controls the gain by the proportional plus integral action. Its output is subtracted from a predetermined frequency reference value $\omega^*$ by the summing point 85, thereby giving a frequency command value $\omega^{**}$. Furthermore, the difference between the mean value $V_A$ of the output voltage which is described referring to FIG. 1 and the predetermined voltage reference value $V_A^*$ is further corrected by the reactive component $\sin\phi$ by the summing point 81, and the corrected difference $\Delta V_A$ is inputted to the automatic voltage regulator 3. The automatic voltage regulator 3 controls its gain by the proportional plus integral action, and outputs a mean voltage command value $V_A^{**}$.

The instantaneous voltage command value generator 7, receiving the frequency command value $\omega^{}$ and the mean voltage command value $V_A^{}$, outputs a sinusoidal instantaneous voltage command value $V^*$ having an amplitude determined by the mean voltage command value (that is, corrected voltage reference value) $V_A^{}$ and a frequency determined by the frequency command value $\omega^{}$.

Furthermore, the difference $\Delta V$ between the voltage command value $V^*$ and the output voltage $V$ is obtained by the summing point 82, and is inputted to the gain adjuster 45. The output of the gain adjuster 45 corrects the voltage command value $V^*$ by the summing point 83, and the corrected voltage command value $Va^*$ is inputted to the PWM signal generator 9. The PWM signal generator 9 provides the PWM inverter 1 with a pulse train controlling the PWM inverter 1.

In the conventional power supply, the sine filter 23 is provided to remove switching ripples involved in the PWM control regardless of a single or parallel operation of the PWM inverter(s). The sine filter 23 includes the damping circuit 27 composed of the resistor 28 and the capacitor 29, which is connected in parallel with the capacitor 26 as shown in FIGS. 1 and 2, in order to damp the oscillation of the reactor 25 and capacitor 26. Eliminating the resistor 28 and capacitor 29 to reduce the size of the sine filter will induce the resonance of the reactor 25 and capacitor 26 in the conventional system, resulting in the deterioration of the output voltage waveform of the PWM inverter 1 owing to the oscillation waveforms accompanying the resonance.

The resistor 28 and capacitor 29, however, present a problem in that they complicate the circuit configuration. In addition, since a part of a main current flows through the damping resistor 28, a large resistor is required as the resistor 28. This will cause the loss due to the damping resistor and the increase in size of the sine filter 23.

In addition, since the outputs of the PWM inverters are connected in parallel, the voltage sources of the PWM inverters are shortcircuited by output cables. Therefore, the instantaneous voltage detected by each PWM inverter is the mean voltage of individual PWM inverters. For this reason, imbalance of output sharing between the PWM inverters cannot be detected.

As a result, a voltage source supplying the current flowing through the capacitor 26 constituting the sine filter 23 cannot be identified. This will disturb the balanced current sharing among the PWM inverters in the parallel operation.

SUMMARY OF THE INVENTION

It is therefore an object of the present invention to provide a PWM inverter control system and method which can limit oscillating waveforms of the output voltage of the PWM inverter without using the damping circuit in the conventional sine filter, and thus reduces the size of the sine (LC low-pass) filter.

It is another object of the present invention to provide a PWM inverter control system and method which can limit ripples of the output voltage involved in the switching operation of the PWM inverter.

It is still another object of the present invention to provide a PWM inverter control system and method for controlling the parallel operation of PWM inverters by controlling an instantaneous value of a load current by using PWM inverters performing instantaneous voltage control, and by identifying the load sharing by individual PWM inverters.

In a first aspect of the present invention, a PWM inverter control system for controlling a PWM inverter comprises:

a low-pass filter connected to the output of the PWM inverter, the low-pass filter including a reactor and a capacitor;

means for detecting an instantaneous output voltage $V$ of the low-pass filter;

means for generating an instantaneous voltage command value $V^*$ on the basis of a predetermined output voltage reference value and the instantaneous output voltage $V$ of the low-pass filter;

means for detecting an instantaneous capacitor current $I_c$ flowing through the capacitor of the low-pass filter;

first correcting means for correcting the instantaneous voltage command value $V^*$ by a detected value of the instantaneous capacitor current $I_c$; and a PWM signal generator for generating a pulse signal for controlling the PWM inverter on the basis of the corrected instantaneous voltage command value $V^*$.

Here, the capacitor of the low-pass filter may comprise a plurality of capacitors connected in parallel, and the means for detecting an instantaneous capacitor current detects a current flowing through at least one of the plurality of capacitors.

In a second aspect of the present invention, a PWM inverter control system controlling a plurality of PWM inverters whose outputs are connected in parallel in a bus board to supply power to a common load, each of the PWM inverters being connected to the bus board through a low-pass filter including a reactor and a capacitor, and being controlled by a controlling circuit constituting the inverter control system, the bus board providing the controlling circuit with an instantaneous output current command value $I_L^*$ that indicates an amplitude of an output current which is assigned, in accordance with the number of PWM inverters operated in parallel, to the PWM inverter controlled by the controlling circuit, the controlling circuit comprises:

means for detecting an instantaneous output current $I_L$ from the low-pass filter;

means for detecting an instantaneous output voltage $V$ of the low-pass filter;

means for detecting an instantaneous capacitor current $I_c$ flowing through the capacitor of the low-pass filter;

means for generating an instantaneous voltage command value $V^*$ on the basis of a difference between the instantaneous output current command value $I_L^*$ and the instantaneous output current $I_L$, and a mean value of the instantaneous output voltage $V$;

first correcting means for correcting the instantaneous voltage command value $V^*$ on the basis of the instantaneous capacitor current $I_c$; and a PWM signal generator generating a pulse signal based on the corrected instantaneous voltage command value V*.

In a third aspect of the present invention, a PWM inverter control method for controlling a PWM inverter supplying power to a load through a low-pass filter including a reactor and a capacitor, the method comprises the steps of:

generating an instantaneous voltage command value V* on the basis of a predetermined output voltage reference value;

detecting an instantaneous output voltage V of the low-pass filter;

detecting an instantaneous capacitor current $I_c$ flowing through the capacitor constituting the low-pass filter;

calculating a correcting amount for correcting the instantaneous voltage command value V* on the basis of a detected value of the instantaneous capacitor current $I_c$;

correcting the instantaneous voltage command value V* by the correcting amount, and outputting the corrected value as a corrected instantaneous voltage command value; and controlling the PWM inverter by the corrected instantaneous voltage command value so that the instantaneous output voltage V agrees with the instantaneous voltage command value V*.

In a fourth aspect of the present invention, a PWM inverter control method for controlling a plurality of PWM inverters whose outputs are connected in parallel to supply power to a load, each of the PWM inverters supplying the load with the power through a low-pass filter including a reactor and a capacitor, the method comprises, for each of the plurality of PWM inverters, the steps of:

generating an instantaneous voltage command value V* on the basis of a predetermined output voltage reference value;

detecting an instantaneous output voltage V of the low-pass filter;

detecting an instantaneous capacitor current $I_c$ flowing through the capacitor constituting the low-pass filter;

calculating a first correcting amount for correcting the instantaneous voltage command value V* on the basis of a detected value of the instantaneous capacitor current $I_c$;

correcting the instantaneous voltage command value V* by the first correcting amount, and outputting the corrected value as a corrected instantaneous voltage command value; and controlling the PWM inverter by the corrected instantaneous voltage command value so that the instantaneous output voltage V agrees with the instantaneous voltage command value V*.

According to one aspect of the present invention, the rate of change of the output voltage V of the PWM inverter is obtained by detecting the capacitor current $I_c$ flowing through the capacitor of the sine filter. This rate of change is used to correct the instantaneous voltage command value V* in addition to the correction of the value V* by the instantaneous output voltage V. This makes it possible to prevent the resonance of the reactor and capacitor constituting the sine filter, and the oscillation induced in the output of the PWM inverter during the switching operation of the PWM inverter, without using a damping circuit connected in parallel with the capacitor constituting the sine filter. As a result, a large loss caused by the mainline current flowing through the resistor of the damping circuit can be limited. In addition, the space for disposing the large damping resistor can be eliminated.

According to another aspect of the present invention, the capacitor constituting the sine filter is composed of a plurality of capacitors, and the current flowing through one of the capacitors is detected. This makes it possible to use current detector of a small capacity, thereby reducing the size of the current detector. Furthermore, since the influence of a wiring impedance, which is caused by the sine filter, the main circuit and the current detector, is restricted to the capacitor to which the current detector is connected, the influence of the wiring impedance on the other capacitors can be obviated. This together with the small capacitance current detector makes it possible to eliminate output voltage ripples generated by the switching operation of the main circuit.

Furthermore, since the control of parallel operation of a plurality of PWM inverters is carried out in accordance with the instantaneous value of the output voltage of the PWM inverters, the output voltage of little distortion can be produced. In addition, since both the output current and capacitor current are controlled on the basis of instantaneous values, the cross current is also controlled by the instantaneous values. This ensures stable sharing of the load current among the PWM inverters even when power is supplied to a nonlinear load from the PWM inverters connected in parallel, thereby stabilizing the parallel operation.

Finally, the active component $\cos\phi$ and the reactive component $\sin\phi$ of a cross current are obtained, and then an instantaneous capacitor current command value $I_c^*$ is obtained from a frequency command value $\omega^{}$ and a mean voltage command value $V_A^{}$. This makes it possible to reduce a stationary cross current, thereby realizing a stable current sharing.

The above and other objects, effects, features and advantages of the present invention will become more apparent from the following description of the embodiments thereof taken in conjunction with the accompanying drawings.

DETAILED DESCRIPTION OF PREFERRED EMBODIMENTS

The invention will now be described with reference to the accompanying drawings.

EMBODIMENT 1

A first embodiment supplies power from a PWM inverter to a load through a sine filter comprising a reactor and a capacitor, but not the damping circuit. In this embodiment, the PWM inverter is controlled in such a manner that the instantaneous value V of the output voltage of the sine filter agrees with an instantaneous voltage command value derived from a predetermined output voltage reference value.

Figure 1:
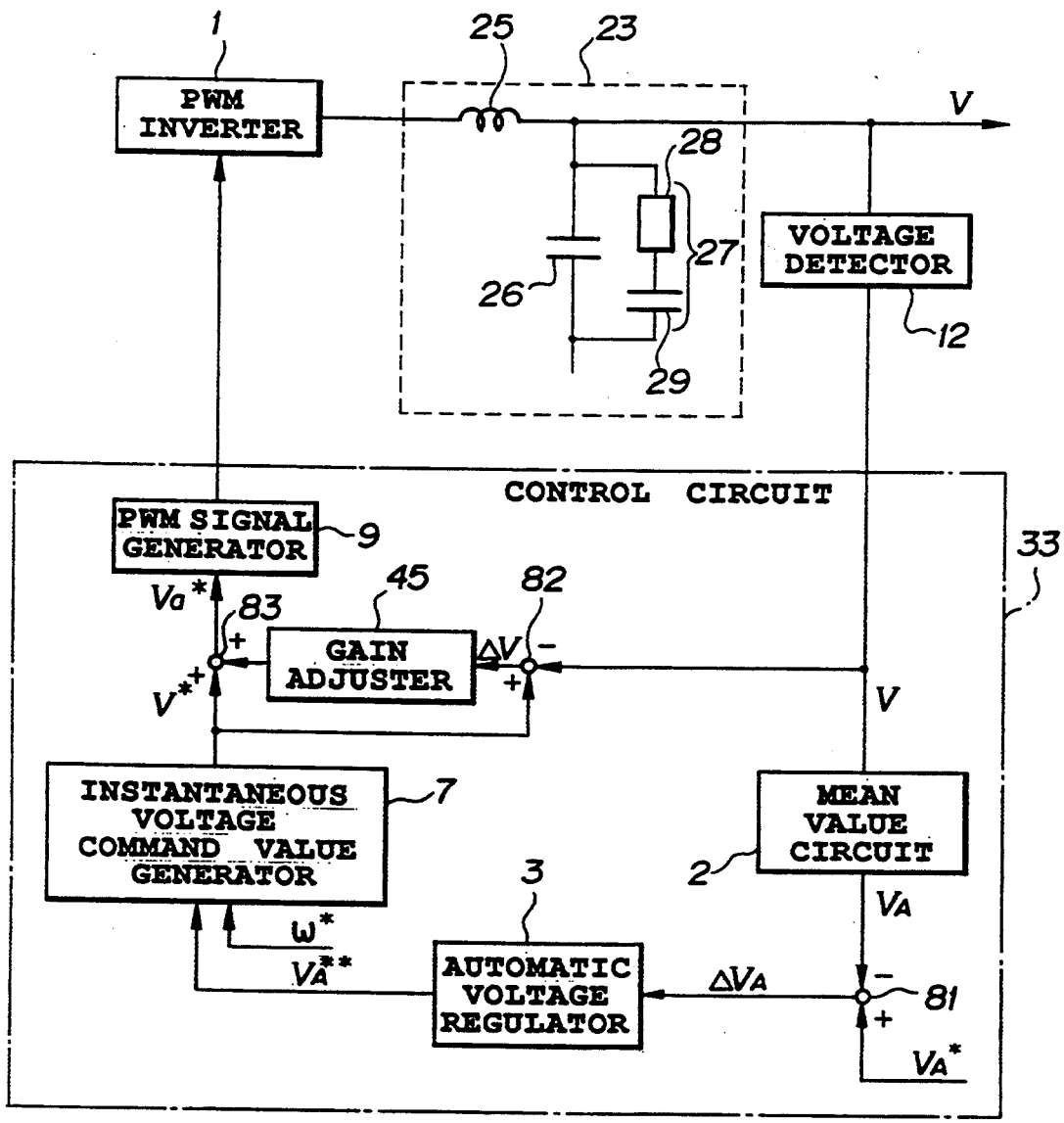
FIG. 1 is a block diagram showing a conventional PWM inverter control system.
Figure 5:
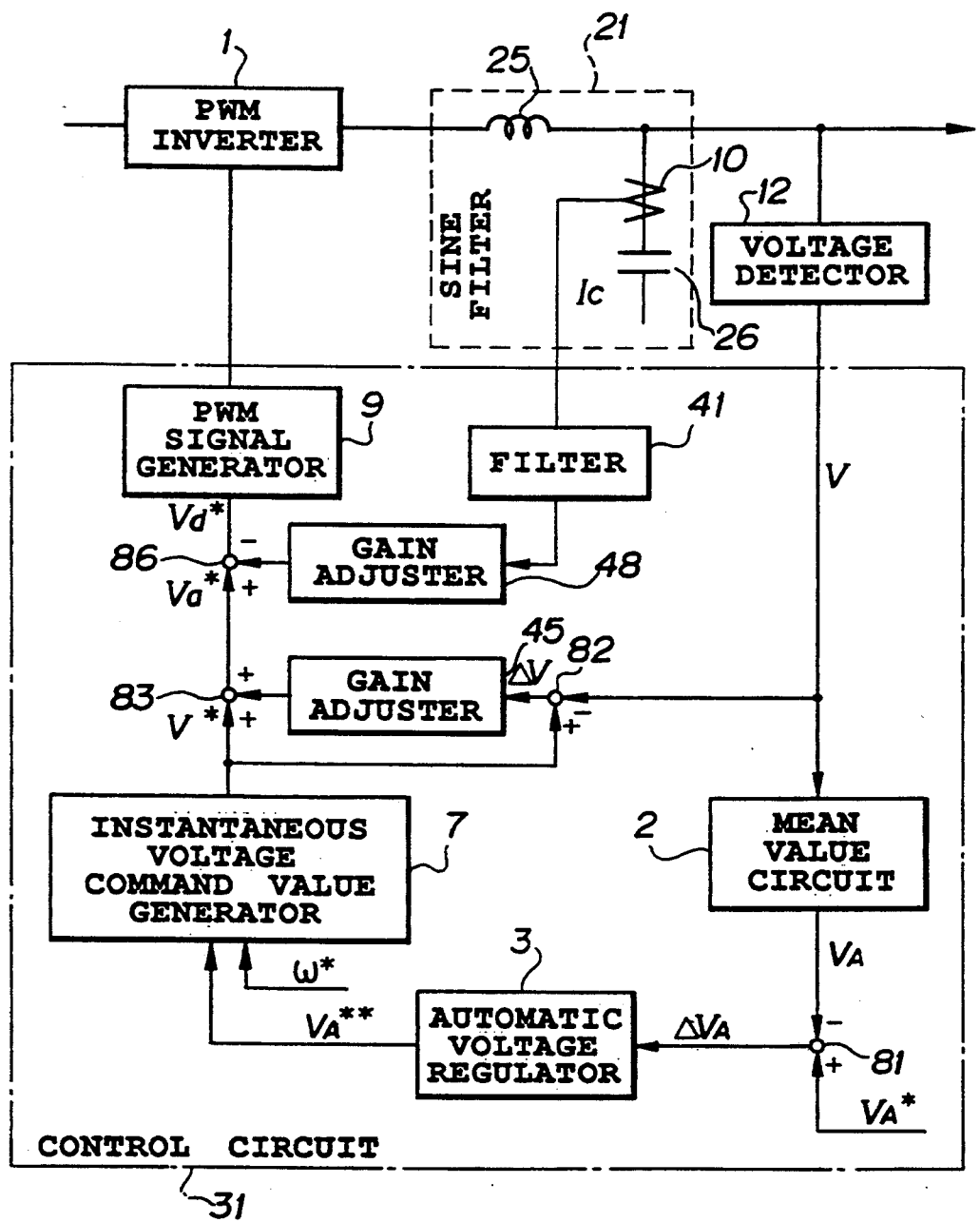
FIG. 5 is a block diagram showing a first embodiment of a PWM inverter control system in accordance with the present invention.

FIG. 5 shows the first embodiment of a PWM inverter control system in accordance with the present invention. In FIGS. 5 and 1, like portions are designated by the same reference numerals, and the description thereof is omitted here. In FIG. 5, the reference numeral 21 designates a sine filter of the first embodiment. The sine filter 21 comprises the reactor 25 and capacitor 26, but not the damping circuit 27 composed of the resistor 28 and the capacitor 29 as shown in FIG. 1. The current $I_c$ flowing through the capacitor 26 is detected by a current detector 10. The detected value of the capacitor current $I_c$ is supplied to a control circuit 31.

The control circuit 31 in FIG. 5 differs from the control circuit 33 in FIG. 1 in that it comprises a filter 41, a gain adjuster 48 and a summing point 86.

In this embodiment, the corrected voltage command value Va* outputted from the summing point 83 is further corrected by the capacitor current $I_c$ detected by the current detector 10. More specifically, the detected value of the capacitor current $I_c$ passes through the low-pass filter 41, and the gain adjuster 48 mainly composed of an operational amplifier, and is supplied to the summing point 86. The summing point 86 subtracts the output of the gain adjuster 48 from the corrected voltage command value Va*, and outputs a twice corrected voltage command value Vd* which is supplied to the PWM signal generator 9. The PWM signal generator 9 produces a pulse signal on the basis of the finally corrected voltage command value Vd*, and controls the PWM inverter 1 by the pulse signal.

As is well known in the art, the capacitor current $I_c$ flowing through the capacitor 26 in the sine filter 21 corresponds to the rate of change (dV/dt) of the output voltage of the PWM inverter 1. This means that the phase of the capacitor current $I_c$ is advanced 90 degrees with regard to the phase of the output voltage V, and hence the delay of the detected value of the output voltage V from the command value V* can be compensated by using the capacitor current $I_c$. Accordingly, correcting the voltage command value V* by the capacitor current enables the control circuit 31 to follow the instantaneous changes in the output voltage of the PWM inverter 1 without delay. This prevents the oscillation in the output voltage V of the PWM inverter 1.

Finally, in FIG. 5, the sequence of corrections by the summing points 83 and 86 can be inverted so that the voltage command value V* is first corrected by the output of the gain adjuster 48, and then by the output of the gain adjuster 45.

EMBODIMENT 2

Figure 6:
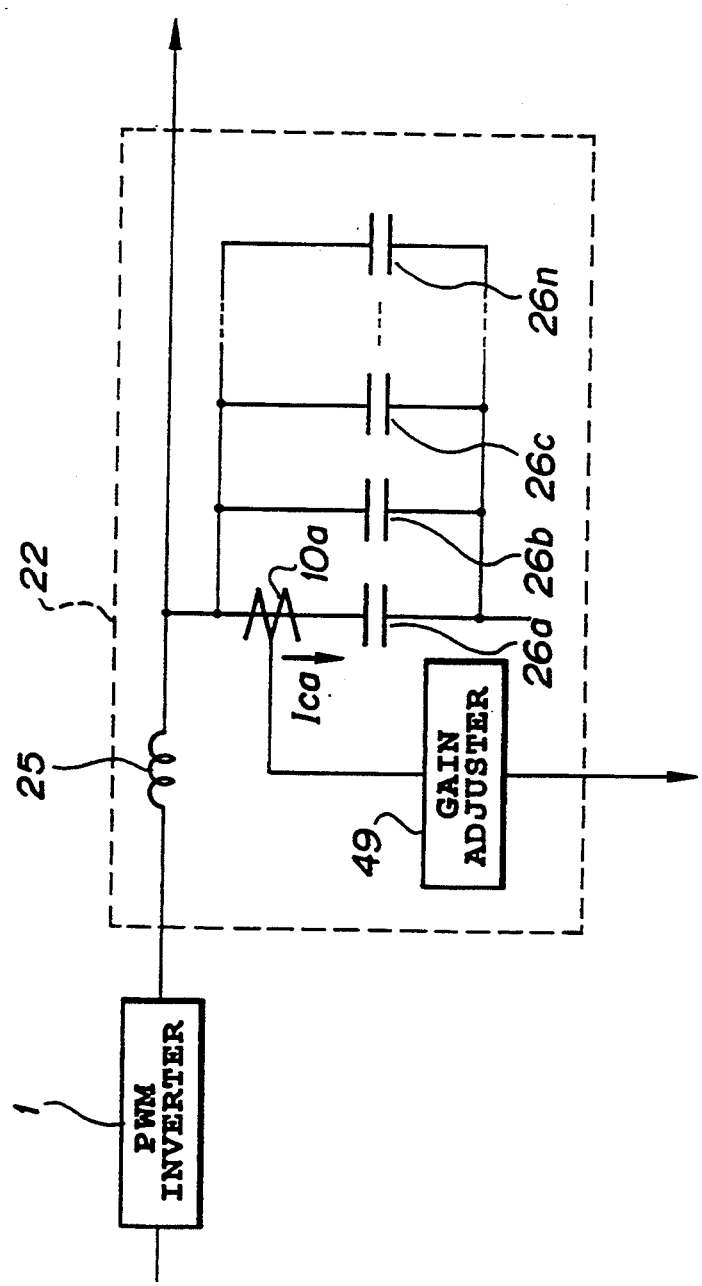
FIG. 6 is a circuit diagram showing a sine filter used in a second embodiment of a PWM inverter control system in accordance with the present invention.

FIG. 6 shows a sine filter 22 of a second embodiment of the PWM inverter control system in accordance with the present invention. In this Figure, the capacitor 26 consists of capacitors 26a, 26b, 26c, ..., and 26n, which are connected in parallel, and a current detector 10a is provided to detect the current flowing through the capacitor 26a. The capacitor current $I_{ca}$ detected by the current detector 10a is inputted to a gain adjuster 49. The gain adjuster 49 amplifies the detected current $I_{ca}$ with a gain corresponding to a ratio of the combined capacitance of the entire capacitors 26a–26n to the capacitance of the capacitor 26a. Thus, the gain adjuster 49 outputs the current detected value corresponding to the capacitor current $I_c$ flowing through the capacitor 26.

In other words, the control circuit of the second embodiment can achieve the same control on the PWM inverter 1 as the control circuit 31 of the first embodiment by replacing the capacitor 26 of the first embodiment by the parallely connected capacitors 26a–26n.

In this embodiment, since the current flowing through a single capacitor is small, the current flowing through the current detector 10a is also small. Accordingly, the current detector 10a of smaller capacity than the current detector 10 can be used. This will reduce the size of the current detector, and serve to reduce the adverse effect of the wiring impedance which is caused by the main circuit, the sine filter and the current detector.

EMBODIMENT 3

A third embodiment of the PWM inverter control system in accordance with the present invention controls a parallel operation of a plurality of PWM inverters to supply power to a common load. The third embodiment utilizes the capacitor current flowing through the capacitor in the sine filter to control the PWM inverter connected to the sine filter as in the first and second embodiments. Although either method for detecting the capacitor current of the first or second embodiment can be used in this embodiment, the detecting method of the first embodiment is used in the following explanation.

Figure 2:
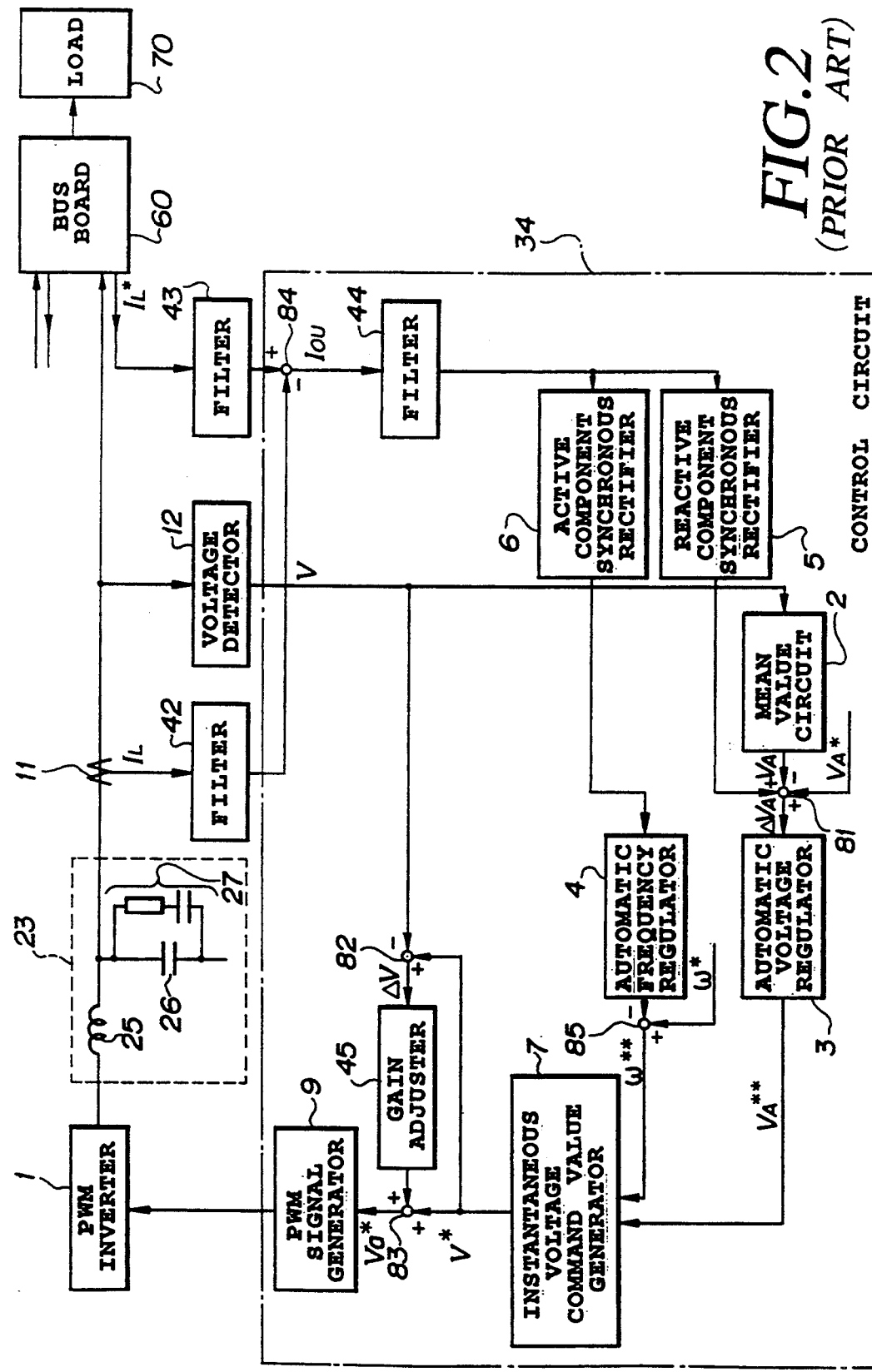
FIG. 2 is a block diagram showing a conventional PWM control system controlling a plurality of PWM inverters connected in parallel.
Figure 3:
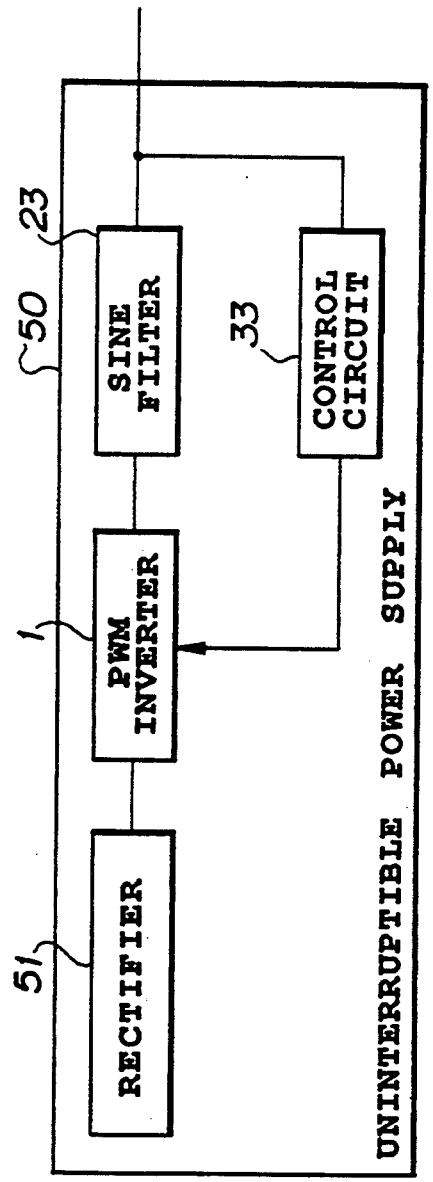
FIG. 3 is a block diagram showing an uninterruptible power supply using the PWM inverter control system as shown in FIG. 1.
Figure 4:
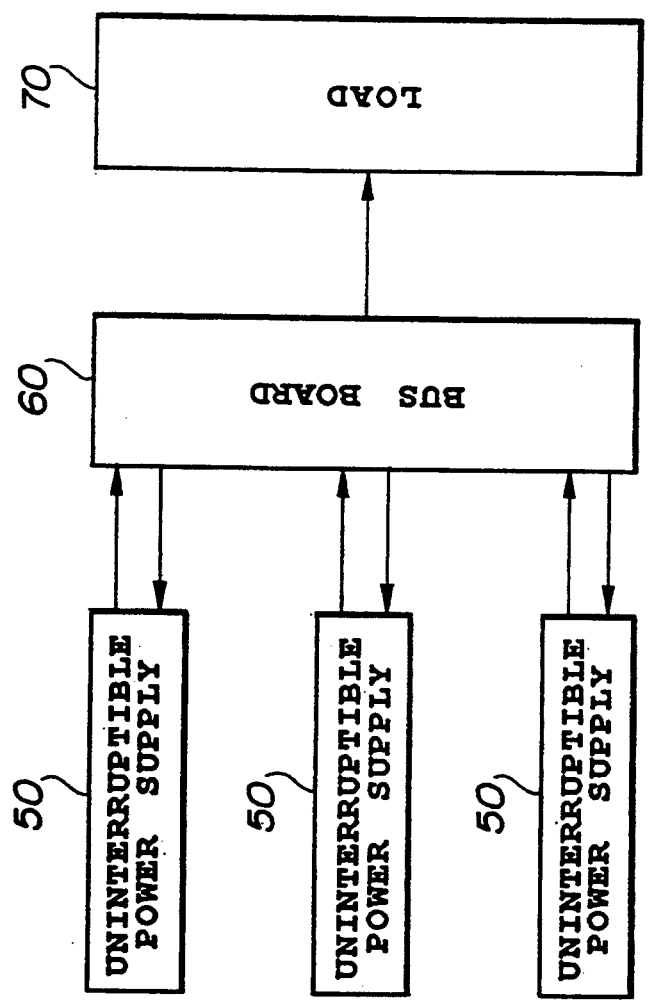
FIG. 4 is a block diagram showing an uninterruptible power supply system using a plurality of uninterruptible power supplies as shown in FIG. 3.
Figure 7:
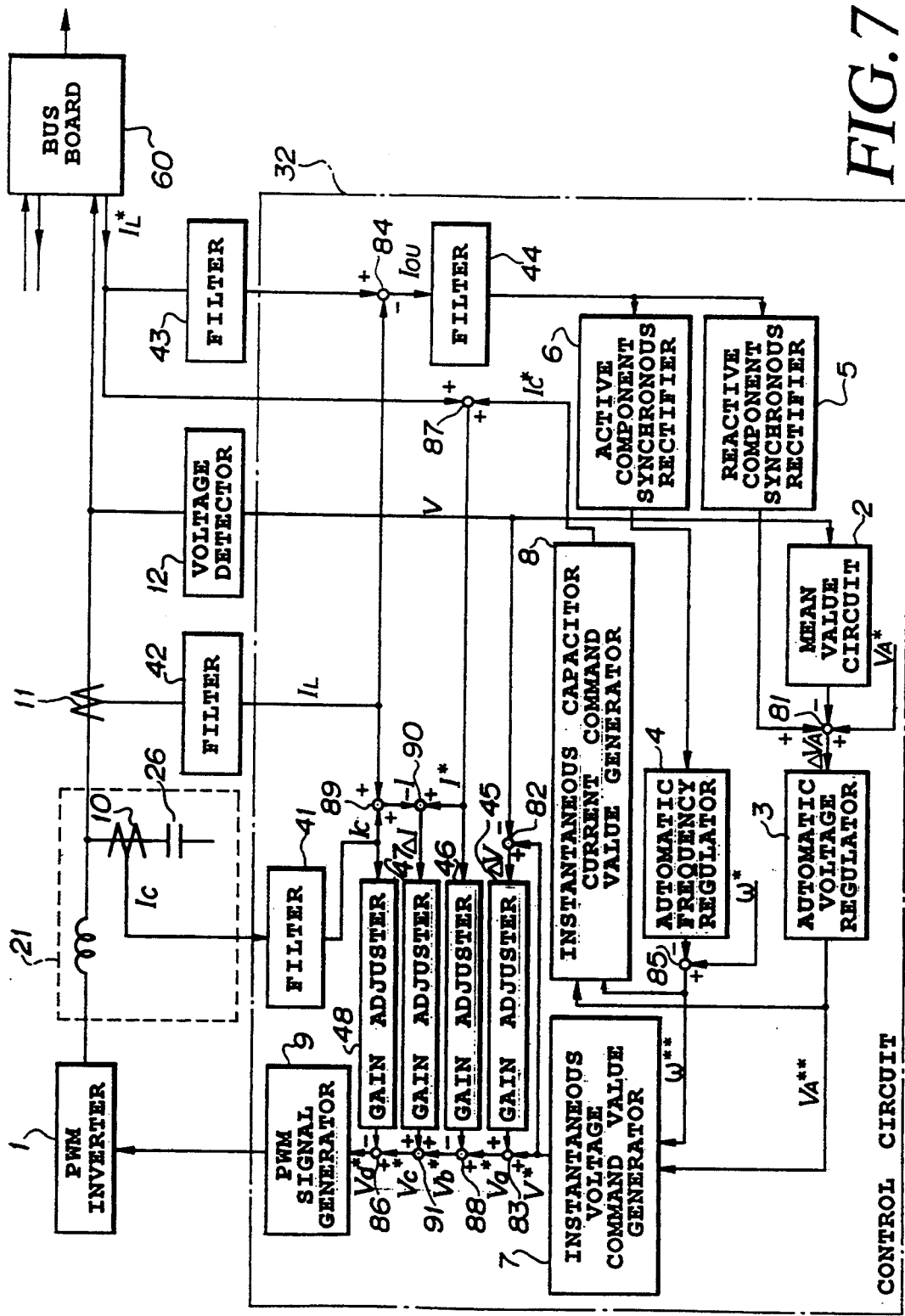
FIG. 7 is a block diagram showing a third embodiment of a PWM inverter control system controlling a plurality of PWM inverters connected in parallel in accordance with the present invention.

FIG. 7 shows the third embodiment of a PWM inverter control system in accordance with the present invention. In FIGS. 7, 2 and 5, like portions are designated by the same reference numerals, and the description thereof is omitted here.

In FIG. 7, the reference numeral 8 designates an instantaneous capacitor current command value generator. The reference numerals 46 and 47 designate gain adjusters that are mainly composed of an operational amplifier, and amplify the input signals with an appropriate gain. The reference numerals 87–91 designate summing points.

The instantaneous capacitor current command value generator 8, receiving the mean voltage command value $V_A$ and the frequency command value $\omega$, generates an instantaneous capacitor current command value $I_c$*. The command value $I_c$* has the following relationship with the voltage command value V*.

$$I_c^* = C\,(dV^*/dt)$$

where C is the capacitance of the capacitor 26 constituting the sine filter 21.

The instantaneous capacitor current command value $I_c$* and the output current command value $I_L$* are added by the summing point 87. The summing point 87 outputs an instantaneous current command value I*

($=I_c^*+I_L^*$), and supplied it to the summing point 88 through the gain adjuster 46.

Furthermore, the instantaneous capacitor current $I_c$ and the instantaneous output current $I_L$ is added by the summing point 89. The summing point 89 outputs a PWM inverter current I ($=I_c+I_L$), and supplies it to the summing point 90. The summing point 90 subtracts the PWM inverter current I from the instantaneous current command value I* and supplies the instantaneous current difference $\Delta I$ ($=I^*-I$) to the summing point 91 through the gain adjuster 47.

On the other hand, the voltage command value V* outputted from the instantaneous voltage command value generator 7 is corrected by the output of the gain adjuster 45 as in the first embodiment, and the corrected command value Va* is supplied from the summing point 83 to the summing point 88. The summing point 88 further corrects the corrected command value Va* by subtracting the output of the gain adjuster 46 from Va*, and outputs a twice corrected command value Vb*.

The command value Vb* is further corrected by the summing point 91 which adds the output of the gain adjuster 47 to Vb*, and outputs a three times corrected command value Vc*. Finally, the command value Vc* is further corrected by the summing point 86 which subtracts the output of the gain adjuster 48 from Vc* as in the first embodiment. The summing point 86 supplies the finally corrected command value Vd* to the PWM signal generator 9.

Thus, the third embodiment sequentially corrects the voltage command value V* by using the instantaneous capacitor current $I_c$, the instantaneous output current $I_L$, the instantaneous output current command value $I_L^*$, and the instantaneous capacitor current command value $I_c^*$. Particularly, since the control circuit 32 controls such that the instantaneous current difference $\Delta I$ between the instantaneous current command value I* and the PWM inverter current I becomes zero, individual PWM inverters outputs current exactly equal to the output current command value $I_L^*$. As a result, the cross current between the PWM inverters are limited.

The correcting circuit comprising the gain adjuster 46 and the summing point 88 is especially effective for a nonresistive load. For example, a load which has a large rate of change in current such as a rectifier may cause overshoot without this correcting circuit. It should be noticed that the output of the gain adjuster 46 is subtracted from the command value Va*, while the output of the gain adjuster 47 is added to the command value Vb*. Accordingly, even if the instantaneous current command value I* increases sharply, and hence the instantaneous current difference $\Delta I$ also increases sharply, the output of the gain adjuster 46 will limit the change in the voltage command value. This will prevent a sudden change in the output voltage. This also serves to limit the cross current.

Finally, in FIG. 7, the summing points 83, 88, 91 and 86 can be arranged in any order so that the voltage command value V* is corrected in any sequence by the outputs of the gain adjusters 45, 46, 47 and 48.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A PWM inverter control system for controlling a PWM inverter comprising:
    a low-pass filter connected to an output of the PWM inverter, said low-pass filter including a reactor and a capacitor;
    means for detecting an instantaneous output voltage (V) of the low-pass filter;
    means for generating an instantaneous voltage command value (V*) on the basis of a predetermined output voltage reference value and the instantaneous output voltage (V) of the low-pass filter;
    means for detecting an instantaneous capacitor current ($I_c$) flowing through the capacitor of said low-pass filter;
    first correcting means for correcting the instantaneous voltage command value (V*) by a detected value of the instantaneous capacitor current ($I_c$); and
    a PWM signal generator for generating a pulse signal for controlling the PWM inverter on the basis of the corrected instantaneous voltage command value (V*).

2. The PWM inverter control system as claimed in claim 1, wherein said capacitor of said low-pass filter comprises a plurality of capacitors connected in parallel, and said means for detecting an instantaneous capacitor current detects a current flowing through at least one of said plurality of capacitors.

3. The PWM inverter control system as claimed in claim 1, wherein said means for generating the instantaneous voltage command value (V*) comprises:
    means for calculating a mean value of the instantaneous output voltage (V) of said low-pass filter;
    a first summing point producing a difference between a predetermined mean voltage reference value and the mean value of the instantaneous output voltage (V);
    a first regulator performing a proportional plus integral correction on the difference outputted from the first summing point; and
    an instantaneous voltage command value generator producing the instantaneous voltage command value (V*) on the basis of the output of said first regulator and a predetermined frequency command value.

4. The PWM inverter control system as claimed in claim 3, further comprising a second correcting means for correcting the instantaneous voltage command value (V*) on the basis of a difference between the instantaneous voltage command value (V*) and the instantaneous output voltage (V).

5. The PWM inverter control system as claimed in claim 4, wherein said second correcting means comprises:
    a second summing point producing a difference between the instantaneous voltage command value (V*) and the instantaneous output voltage (V);
    a first gain adjuster adjusting the amplitude of the difference outputted from the second summing point; and
    a third summing point adding the output of said first gain adjuster to the instantaneous voltage command value (V*).

6. The PWM inverter control system as claimed in claim 5, wherein said first correcting means comprises:

a second gain adjuster adjusting an amplitude of the detected value of the instantaneous capacitor current ($I_c$); and a fourth summing point subtracting the output of said second gain adjuster from an output of the third summing point.

7. The PWM inverter control system as claimed in claim 6, wherein said capacitor of said low-pass filter comprises a plurality of capacitors connected in parallel, and said means for detecting a capacitor current detects a current flowing through at least one of said plurality of capacitors.

8. A PWM inverter control system controlling a plurality of PWM inverters whose outputs are connected in parallel in a bus board to supply power to a common load, each of said PWM inverters being connected to the bus board through a low-pass filter including a reactor and a capacitor, and being controlled by a controlling circuit constituting the inverter control system, said bus board providing the controlling circuit with an instantaneous output current command value ($I_L^*$) that indicates an amplitude of an output current which is assigned, in accordance with the number of PWM inverters operated in parallel, to the PWM inverter controlled by the controlling circuit, said controlling circuit comprising:

means for detecting an instantaneous output current ($I_L$) from the low-pass filter;

means for detecting an instantaneous output voltage (V) of said low-pass filter;

means for detecting an instantaneous capacitor current ($I_c$) flowing through the capacitor of said low-pass filter;

means for generating an instantaneous voltage command value (V*) on the basis of a difference between the instantaneous output current command value ($I_L^*$) and said instantaneous output current ($I_L$), and a mean value of the instantaneous output voltage (V);

first correcting means for correcting the instantaneous voltage command value (V*) on the basis of the instantaneous capacitor current ($I_c$); and a PWM signal generator generating a pulse signal based on the corrected instantaneous voltage command value (V*).

9. The PWM inverter control system as claimed in claim 8, further comprising a second correcting means for correcting the instantaneous voltage command value (V*) on the basis of a difference between the instantaneous voltage command value (V*) and the instantaneous output voltage (V).

10. The PWM inverter control system as claimed in claim 9, further comprising a third correcting means for correcting the instantaneous voltage command value (V*) on the basis of an instantaneous current command value (I*) obtained by adding an instantaneous capacitor current command value ($I_c^*$) and the instantaneous output current command value ($I_L^*$), and a difference between the instantaneous current command value (I*) and a PWM inverter current (I) obtained by adding the instantaneous output current ($I_L$) and the instantaneous capacitor current ($I_c$).

11. The PWM inverter control system as claimed in claim 10, wherein said means for generating an instantaneous voltage command value (V*) comprises:

a first summing point calculating a cross current ($I_{ou}$) by subtracting the instantaneous output current ($I_L$) from the instantaneous output current command value ($I_L^*$);

means for obtaining an active component of the cross current ($I_{ou}$) by a synchronous rectification;

means for obtaining a reactive component of the cross current ($I_{ou}$) by a synchronous rectification;

means for obtaining a mean value of the instantaneous output voltage (V);

a first regulator performing a proportional plus integral correction on the active component;

a second summing point obtaining a sum of an output of the first regulator and a predetermined frequency reference value;

a third summing point obtaining a sum of the reactive component and a predetermined mean voltage reference value, and then obtaining the difference between the sum and the mean value of the instantaneous output voltage (V);

a second regulator performing a proportional plus integral correction on an output of said third summing point; and means for generating the instantaneous voltage command value (V*) on the basis of outputs of said first and second regulators.

12. The PWM inverter control system as claimed in claim 11, wherein said second correcting means comprises:

a fourth summing point producing a difference between the instantaneous voltage command value (V*) and the instantaneous output voltage (V);

a first gain adjuster controlling the amplitude of the difference outputted from the fourth summing point; and a fifth summing point adding an output of said first gain adjuster to the instantaneous voltage command value V*.

13. The PWM inverter control system as claimed in claim 12, wherein said third correcting means comprises:

means for generating the instantaneous capacitor current command value ($I_c^*$) on the basis of the outputs of said first and second regulators;

a sixth summing point obtaining the instantaneous current command value (I*) as the sum of the instantaneous capacitor current command value ($I_c^*$) and the instantaneous output current command value ($I_L^*$);

a second gain adjuster controlling the amplitude of the instantaneous current command value (I*) outputted from the sixth summing point;

a seventh summing point obtaining the PWM inverter current (I) as the sum of the instantaneous capacitor current ($I_c$) and the instantaneous output current ($I_L$);

an eighth summing point obtaining the difference ($\Delta I$) between the instantaneous current command value (I*) and the PWM inverter current (I);

a third gain adjuster controlling the amplitude of a difference ($\Delta I$) outputted from the eighth summing point;

a ninth summing point correcting an output of the fifth summing point by an output of the second gain adjuster; and a tenth summing point correcting an output of the ninth summing point by an output of the third gain adjuster.

14. The PWM inverter control system as claimed in claim 13, wherein said first correcting means comprising:
- a fourth gain adjuster controlling the amplitude of a detected value of the instantaneous capacitor current ($I_c$); and
- an eleventh summing point subtracting an output of said fourth gain adjuster from an output of the tenth summing point.

15. The PWM inverter control system as claimed in claim 14, wherein said capacitor of said low-pass filter comprises a plurality of capacitors connected in parallel, and said means for detecting a current detects a current flowing through at least one of said plurality of capacitors.

16. A PWM inverter control method for controlling a PWM inverter supplying power to a load through a low-pass filter including a reactor and a capacitor, said method comprising the steps of:
- generating an instantaneous voltage command value ($V^*$) on the basis of a predetermined output voltage reference value;
- detecting an instantaneous output voltage (V) of the low-pass filter;
- detecting an instantaneous capacitor current ($I_c$) flowing through the capacitor constituting the low-pass filter;
- calculating a correcting amount for correcting the instantaneous voltage command value ($V^*$) on the basis of a detected value of the instantaneous capacitor current ($I_c$);
- correcting the instantaneous voltage command value ($V^*$) by the correcting amount, and outputting the corrected value as a corrected instantaneous voltage command value; and
- controlling the PWM inverter by the corrected instantaneous voltage command value so that the instantaneous output voltage (V) agrees with the instantaneous voltage command value ($V^*$).

17. The PWM inverter control method as claimed in claim 16, wherein said capacitor of said low-pass filter comprises a plurality of capacitors connected in parallel, and the instantaneous capacitor current ($I_c$) is detected by detecting a current flowing through at least one of said plurality of capacitors.

18. A PWM inverter control method for controlling a plurality of PWM inverters whose outputs are connected in parallel to supply power to a load, each of the PWM inverters supplying the load with the power through a low-pass filter including a reactor and a capacitor, said method comprising, for each of the plurality of PWM inverters, the steps of:
- generating an instantaneous voltage command value ($V^*$) on the basis of a predetermined output voltage reference value;
- detecting an instantaneous output voltage (V) of the low-pass filter;
- detecting an instantaneous capacitor current ($I_c$) flowing through the capacitor constituting the low-pass filter;
- calculating a first correcting amount for correcting the instantaneous voltage command value ($V^*$) on the basis of a detected value of the instantaneous capacitor current ($I_c$);
- correcting the instantaneous voltage command value $V^*$ by the first correcting amount, and outputting a corrected value as a corrected instantaneous voltage command value; and
- controlling the PWM inverter by the corrected instantaneous voltage command value so that the instantaneous output voltage (V) agrees with the instantaneous voltage command value ($V^*$).

19. The PMM inverter control method as claimed in claim 18, further comprising the steps of:
- assigning an instantaneous output current command value ($I_L^*$) to each of the plurality of the PWM inverters in accordance with the number of PWM inverters operated in parallel;
- detecting an instantaneous output current $I_L$ of the low-pass filter;
- calculating a second correcting amount for correcting the instantaneous voltage command value ($V^*$) on the basis of the instantaneous output voltage (V); and
- correcting the instantaneous voltage command value ($V^*$) by the second correcting amount, and outputting the corrected value as the instantaneous voltage command value to be corrected by the first correcting amount, so that the instantaneous output current ($I_L$) agrees with the instantaneous output current command value ($I_L^*$).

20. The PWM inverter control method as claimed in claim 18, further comprising the steps of:
- generating an instantaneous capacitor current command value ($I_c^*$) on the basis of a difference between the instantaneous output current command value ($I_L^*$) and the instantaneous output current ($I_L$), and a mean value of the instantaneous output voltage (V);
- calculating a third correcting amount for correcting the instantaneous voltage command value $V^*$ on the basis of the instantaneous capacitor current command value ($I_c^*$); and
- correcting the instantaneous voltage command value $V^*$ by the third correcting amount, and outputting a corrected value as the instantaneous voltage command value to be corrected by the first correcting amount, so that the capacitor current ($I_c$) agrees with the instantaneous capacitor command value ($I_c^*$).

21. The PWM inverter control method as claimed in claim 20, further comprising the steps of:
- calculating a cross current ($I_{ou}$) by subtracting the instantaneous output current ($I_L$) from the instantaneous output current command value ($I_L^*$);
- obtaining an active component of the cross current ($I_{ou}$) by synchronously rectifying the cross current ($I_{ou}$);
- obtaining a reactive component of the cross current ($I_{ou}$) by synchronously rectifying the cross current ($I_{ou}$);
- obtaining a mean output voltage command value by correcting the predetermined output voltage reference value by the reactive compound;
- obtaining a frequency command value by correcting a predetermined frequency reference value by the active component; and
- obtaining the instantaneous capacitor current command value ($I_c^*$) on the basis of the mean output voltage command value and the frequency command value.

22. The PWM inverter control method as claimed in claim 18, wherein said capacitor of said low-pass filter comprises a plurality of capacitors connected in parallel, and the capacitor current is detected by detecting a current flowing through at least one of said plurality of capacitors.

* * * * *